R. M. THOMPSON.
FLYING MACHINE.
APPLICATION FILED FEB. 23, 1911.

1,282,494. Patented Oct. 22, 1918.
2 SHEETS—SHEET 1.

WITNESSES:
A. L. McGrath
M. J. McNeil

INVENTOR
Robert M. Thompson
BY
Elliott
ATTORNEY

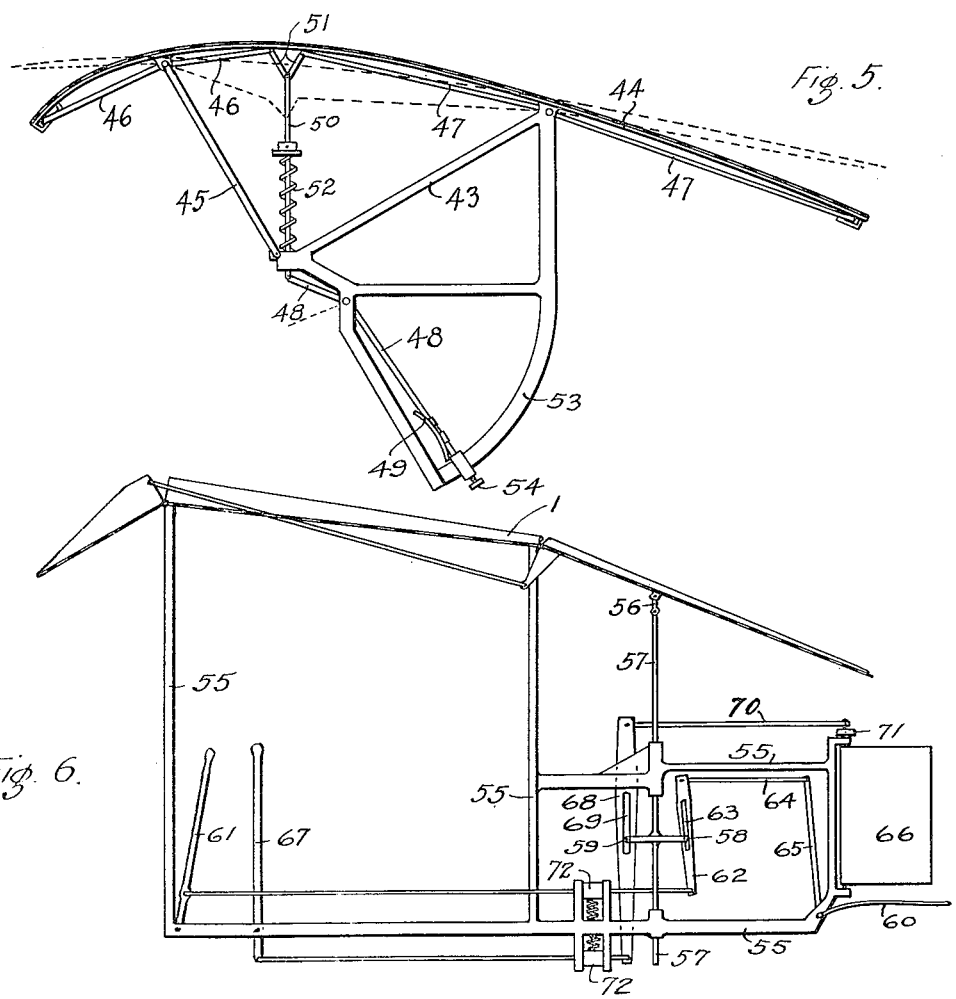

UNITED STATES PATENT OFFICE.

ROBERT M. THOMPSON, OF TACOMA, WASHINGTON.

FLYING-MACHINE.

1,282,494.  Specification of Letters Patent.  Patented Oct. 22, 1918.

Application filed February 23, 1911. Serial No. 610,319.

*To all whom it may concern:*

Be it known that I, ROBERT M. THOMPSON, a citizen of the United States, residing in Tacoma, in the county of Pierce and State of Washington, have invented a certain new and useful Improvement in Flying-Machines, of which the following is a specification.

Figure 1:
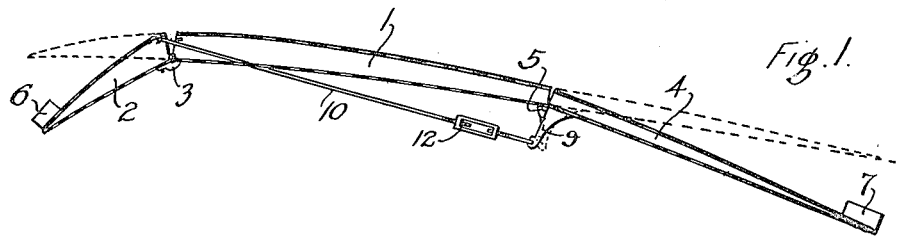
Figure 2:
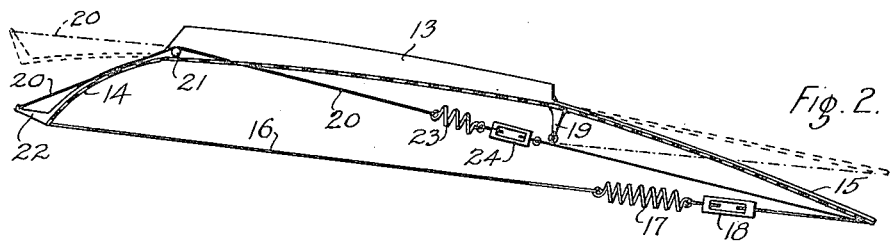
Figure 3:
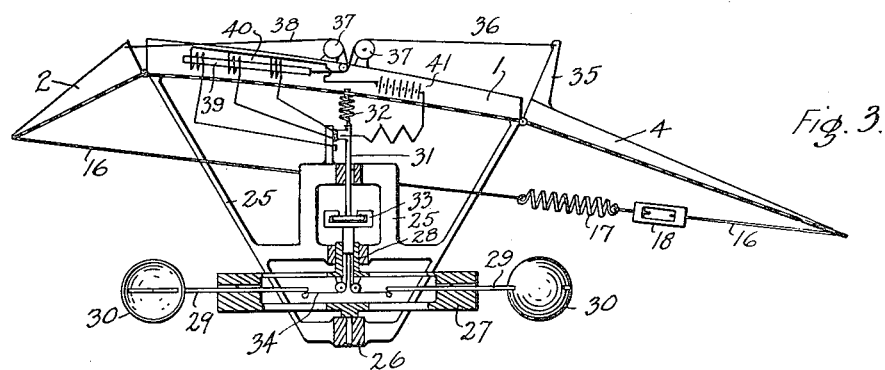
Figure 4:
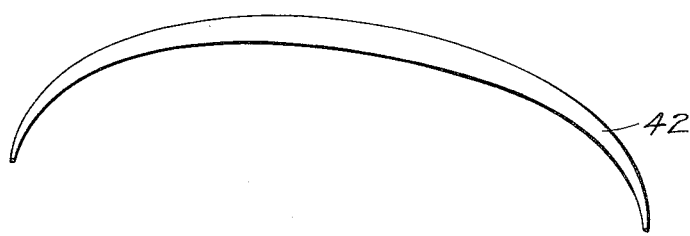

This invention relates particularly to the wings or planes of a flying machine, and has for its object, first to provide automatic means to change the curvature of said plane, whereby the head resistance thereof is reduced as the speed increases; second, to provide means whereby the curvature of the wing will be such as to produce the greatest vertical lift for the different head resistances thereof; and third, to provide means interposed between the manual controlling devices and the vertical and horizontal rudders, whereby the action of said manual control is modified in accordance with the speed at which the machine is flying through the air. I attain these and other objects by the devices, mechanisms and arrangements illustrated in the accompanying drawings, in which Figure 1 is a section of a wing having its front and rear sections hinged to the rigid central section; Fig. 2 is a similar view showing, however, said front and rear sections formed integral with said central section but being relatively flexible; Fig. 3 is a similar view of a wing similar to that shown in Fig. 1, but having the hinged sections controlled by electric means, said electric means controlled by wind operated means; Fig. 4 is an elevation showing, in exaggerated form a rib of varying depth whereby a given deflecting force will produce a desired change in curvature throughout its length; Fig. 5 is a section of a wing formed of one continuous rib whose shape is controlled by means of wind operated mechanism; and Fig. 6 is a view, largely diagrammatic, illustrating a method of modifying the action of the manual control on the vertical and horizontal rudders at different speeds of the machine. Similar numerals of reference refer to similar parts throughout the several views.

It has been demonstrated that a plane of a given section will maintain an increasing ratio of weight with an increase in its speed and that therefore with a given weight to sustain, a smaller plane may be used at higher speeds than at lower speeds. The principal object in reducing a plane area with the increase in the speed is that by so doing the head resistance or drag of the flying machine is reduced and therefore the power necessary to maintain it at said speed would be correspondingly reduced. It is evident, therefore, that if the head resistance of a large plane is reduced as the speed is increased there is no advantage in reducing the plane area, and this is the main object of my invention. Another effect of the change in the speed of the flying machine is found in the sensitiveness of the rudders controlling the machine, for if a machine is traveling, say at 30 miles an hour, a given movement of the controlling mechanism will not be nearly as effective on the machine as the same movement thereof if the machine were traveling at 60 miles per hour, and that therefore the aviator has to keep in mind the actual speed at which he is traveling through the air in making any adjustment of the controlling devices of the machine, and therefore a machine that is normally run at a slow speed is likely to be dangerously unstable if the speed is greatly increased, for, any slight movement of the controlling mechanism, which at the slower speed would have little or no effect on the machine, may have a great effect thereon at a high speed. In view of this fact I have devised a means whereby the sensitiveness of the manual control is reduced with the increase in speed through the air, so that the same motion of the manual controlling means will produce a less motion of the rudder controlled thereby. Both of these objects are dependent on the speed of the machine through the air and they are therefore joined together in the apparatus illustrated though the latter mechanism is illustrated only in Fig. 6, in connection with a wing formed similar to that shown in Fig. 1.

Referring now to Fig. 1 of the drawings; a central rigid section 1 of the plane is suitably secured to the flying machine in any desired way. A front section 2 is hinged at its lower corner to the adjacent point of said section 1 in such manner as to be free to turn relatively to said section 1 through a considerable angle. A stop 3 may be secured to said section 2 to limit the downward motion thereof. A rear section 4 is similarly hinged to the rear edge of said section 1 and is also provided with a stop 5. A weight 6 is mounted on the front edge of the front section 2 and another weight 7 is mounted on the rear edge of the rear section 4, said weights being adapted to pull said hinged sections downward at all times. A bracket 9 is secured to the front edge of the rear section 4, said bracket extending downward therefrom. A bar 10, having an adjustable turnbuckle 12 therein, is secured to said bracket 9 and to the front section 2 at a point above the hinge connecting said section 2 to said rigid section 1. As above stated the weights 6 and 7 tend to pull the hinged sections downward and to increase the head resistance of the wing, thus providing a wing shaped suitably for slow speed. While the machine is flying it is evident that the weight thereof is sustained by the wing and that the greatest pressure will therefore be on the lower side. Now, if the speed is increased, the pressure on the lower side is increased at a greater rate, as is evident from the fact that the same plane area will sustain greater weight at the said increased speed, and therefore, if the weights 6 and 7 are properly adjusted, this increased pressure will turn the said sections 2 and 4 upward on their hinges, but especially section 4, until the pressure thereunder is reduced and is counterbalanced by the said weights. The head pressure on the upper surface of the section 2 will resist the upward pressure on the under side thereof and therefore it is necessary to connect said sections 2 and 4 together so that they work in reverse directions, and as the section 4 is forced upward it acts through the bracket 9 and the bar 10 on the said section 2 and pulls it upward.

Referring now to Fig. 2, the ribs in this machine are each formed of one piece, the central portion 13 thereof being made of much greater depth than the front flexible portion 14, or the rear flexible portion 15 thereof; said portion 13 is slightly curved but is substantially rigid in form. The tension cord 16 joins the front and rear ends of the ribs and has a spring 17 and an adjustable turnbuckle 18 therein, said parts being substituted for the weights 6 and 7, above described, and acting to draw the front and rear edges of the plane downward. A bracket 19 extends downward from the rib at a point near the rear end of the rigid part 13 and is adapted to be engaged by the tension wire 20 which extends from the rear edge of the part 15, under said bracket 19, passing through the plane and over a roller 21, and is attached to an upward extending bracket 22 mounted on the front end of the front flexible portion 14, said wire 20 having a suitable spring 23 and turnbuckle 24 therein. The action of this form of plane is similar to that above described but differs in the fact that each rib is integral from end to end, but is of varying flexibility. The ribs of the wing may vary in flexibility and they may be all brought to bend equally under the same conditions by adjusting the tension in the cord 16 and wire 20.

In the form illustrated in Fig. 3, I have shown the plane constructed substantially the same as in Fig. 1, but have substituted for the bar 10 an electric tension device which is controlled by a wind operated centrifugal device as hereinafter described. To the central rigid section 1 of the wing is secured a suitable supporting frame 25. In suitable bearings 26 in said frame is mounted a rotatable body 27, the upper axle 28 thereof, being hollow. This body 27 carries a plurality of radiating spokes 29, each of said spokes passing through the rim of said body 27 and being radially movable therein, but being so formed that they cannot turn in said body. Each of these spokes 29 carries a substantially hemispherical cup 30 on its outer end, said cups being formed in a manner similar to those at present in use in anemometers. These cups 30 are rotated by the action of the wind of motion of the machine and cause the body 27 to rotate with them. A vertically movable rod 31 is mounted in a suitable bearing in the frame 25 in such a manner that it cannot rotate therein, and has the same axis as the rotating body 27. This rod 31 is pulled upward by a tension spring 32 and is provided at its lower end with a flange, adapted to be engaged by a rotating flange 33, said flange 33 being vertically movable and having its stem entering and engaging in the hollow axle 28 of the rotating body 27. A flexible cord 34 is secured to the inner ends of each of the spokes 29 and extends therefrom to the stem of said flange 33 to which each of the said cords is also secured. These cords 34 are passed over suitable rollers in the frame of the body 27, so that the direction of the motion of their ends is changed. As the cups 30 rotate, the centrifugal force thereon tends to make them fly outward thus pulling the spokes 29 outward. This motion is communicated to the rod 31 by the cords 34 and the rotating flange 33, and is opposed by the tension in the spring 32. The strength of this centrifugal force will vary with the lineal velocity of motion of the cups and this lineal rate of motion will vary directly with the wind of motion of the machine and will be independent of the distance from the center of the rotating body 27 to the cups 30. Therefore the tension in the spring 32 will vary directly with the strength of the wind of motion. The rear portion 4 of the wing is provided at its hinge with an upward extending bracket 35, and a flexible wire 36 is secured thereto and passes around a roller 37 mounted on the machine. A similar wire 38 is attached to the front section 2 of the wing and passes around another roller 37 mounted adjacent to said first roller 37. These wires 36 and 38 extend downward from the rollers 37 and are secured to an iron plunger 39 acting in a suitable solenoid 40. I have divided the solenoid into sections arranged axially so that when the central and rear sections are energized the plunger will be drawn a certain distance into the solenoid 40 and so that when the central and front sections are energized the said plunger is drawn a greater distance thereinto. At a suitable point in the flying machine, is mounted a convenient source of electric energy, indicated at 41 in the drawings. A wire extends from one terminal of the source of electric energy to one end of each section of the solenoid 40 and another wire from the other terminal thereof to a brush mounted on the rod 31. At a point adjacent to said brush is mounted a series of contacts adapted to be engaged by the brush, each of said contacts being electrically connected to the other end of the corresponding sections of the solenoid. The brush is preferably adapted to engage two of the said contacts at a time. The wing sections 2 and 4 are connected together by the tension cord 16, spring 17 and turnbuckle 18, or are provided with weights as in Fig. 1. The action of this device is similar to that above described, except that in this case the wind operated control may be centrally located on the machine while the electric devices for changing the shape of the wing may be located at as many different points thereon as is convenient, all of said electric devices acting together and being controlled by the said central wind operated mechanism. As the speed increases the lineal velocity of the cups 30 will increase and the centrifugal force will correspondingly increase thus drawing the brush downward into engagement with the contact and causing the solenoid to move the plunger 39 to pull the wires 36 and 38, and thus to turn the sections 2 and 4 upward in a manner similar to that already described.

Referring now to Fig. 4; in this figure it is intended to illustrate one method of obtaining a variety of desired curves of the rib 42, each corresponding with a definite deflecting force. It will be observed that this is attained by the varying depth of the rib so that it will bend most at the points where it is shallowest and will be relatively stiff and rigid at the parts where it is deepest.

Referring now to Fig. 5; in this case the ribs are made continuous from end to end, said ribs being shaped as just mentioned in relation to Fig. 4. A frame 43 is secured at a convenient point on the rib 44 and is secured to another point on said rib by a link 45. The rib-bending arms 46 and 47 are pivoted at each point where the frame 43 and link 45 engage the rib 44, and pass respectively to the front and rear ends of the rib 44, at which points they are loosely attached thereto. These arms extend inward from their pivots to a point near the center of the rib and their lengths are so arranged that equal movements of their inner ends produce the desired bending of the front and rear ends of the rib. At a suitable point in the frame 43 is pivoted an operating lever 48 carrying at one end a small plane 49 adapted to be acted upon by the wind of motion to turn the lever 48 on its pivot. The lever 48 is secured to a rod 50 which extends upward from the end thereof and which is secured to the inner ends of the arms 46 and 47 by the links 51. A compression spring 52 is placed between the frame 43 and a collar on the rod 50, said spring acting to resist a downward motion of said rod. A quadrant 53 may be formed on the frame 43 and a screw clamp 54, or other adjustable securing means, may be mounted on lever 48 to engage said quadrant 53, so that said lever may be clamped thereto in any position. Although I have shown the lever 48 acting only on one rib it is evident that it may be similarly attached to all the ribs of the plane, bending them equally and simultaneously. The action of this device is briefly described as follows: The rib 44 normally assumes the curved position as shown in the drawing and is of sufficient stiffness to retain its shape for the slower speeds of the machine. As the speed is increased the wind of motion forces the small plane 49 backward and upward, turning the lever 48 on its pivot and drawing the rod 50 downward against the action of the spring 52. This downward motion of the rod 50 acts, through the links 51, on the ends of the arms 46 and 47 so that said arms are turned in their pivots and, since these pivots are secured to the frame 43 and to the plane 44, and the link 45, said motion will bend upward the front and rear ends of the rib and this upward bending will result in a relatively downward bending of the portion of the rib 44 between the said pivots. This action will slightly increase the distance between the pivots and it is therefore necessary that said pivots be linked together in such a way as to allow a slight relative motion thereof. If it is desired to maintain the curvature at any predetermined point the clamp 54 is made to engage the quadrant 53 so that said lever 48 cannot turn on its pivot.

Referring now to Fig. 6; I have illustrated therein, largely in diagrammatic form, a means of connecting the motion of the wing-rib, which is adjusted by any of the above means to assume positions at different speeds through the air, to the controlling mechanisms of the flying machine so that the sensitiveness of the said control is reduced as the speed is increased. I attain this object by interposing between the manual control and the controlling device, as the rudders, an adjustable pivot which changes its position relatively to said mechanism with the changes in position of the wing-rib, such changes being arranged to reduce the motion of the controlling means relatively to the motion of the manual control as the speed is increased. It is evident that this may be accomplished in many different ways. I have therefore only indicated a mechanism by which this object can be accomplished. A suitable frame 55 is secured to the rigid portion 1 of the plane and is provided with suitable extensions carrying the vertical and horizontal rudders and with suitable guides for the adjustable pivots. To the rear section 4 of the wing-rib is secured, by means of a link 56, a vertically moving rod 57, said rod being guided in suitable bearings as above mentioned, and carrying the pivots 58 and 59 at a suitable point therein, said pivots being adapted to be moved vertically by the motion of said rear section 4 of the wing-rib, but being confined against longitudinal or lateral motion by the said bearings. Referring now to the control of the horizontal rudder 60, which is pivoted at a suitable point to the frame 55, a manual control 61 is mounted on the frame 55 and transmits its motion to the lower end of the vertical lever 62. This lever 62 is provided with a slot 63 running lengthwise thereof, in which slot the pivot 58 is mounted so as to have motion along the said slot. The upper end of said lever 62 is connected by a link 64 to an arm 65 secured to the horizontal rudder 60, in such manner that the motion of the upper end of the said lever is communicated to the rudder. It is evident that if the pivot 58 is half way between the ends of the lever 62, the motions of the ends thereof, will be equal and opposite, and that if the pivot 58 is raised relatively to the said lever 62, so that it is nearer the upper end thereof, then the said upper end will move proportionately less than the lower end, and since the lower end is connected to the manual control, it is evident that equal movements on the manual control will produce less movements of the upper end of the lever, and since this end is connected to the rudder 60 the said rudder will be moved through a less angle. Referring now to the control of the vertical rudder 66, which is pivoted to the frame 55, a manual control 67 is mounted on the frame and transmits its motion to the lower end of the vertical lever 68. This lever 68 is provided with a slot 69 running lengthwise thereof, in which slot the pivot 59 is mounted so as to have motion along the said slot. The upper end of the lever 68 is connected by a rod 70 to a horizontal arm 71 secured to the vertical rudder 66 and extending at right angles thereto. This mechanism controls said rudder 66 in the same way as the above described mechanism and the control thereof is modified by the position of the pivot 59. The levers 62 and 68 are each yieldingly supported by the rods which connect the manual controls therewith, said rods passing through spring supported bearings 72. It is evident that this mechanism could be attached to any of the forms of ribs shown, or could be connected to a wind operated device, such as indicated in Figs. 3 or 5.

Having described my invention, what I claim is:

1. In a flying machine, the combination with a plane having the front and rear sections thereof relatively adjustable; means connecting said sections whereby they are mutually and simultaneously adjusted; and means controlled by the wind of motion of the flying machine and adapted to adjust said sections to decrease the head resistance of the plane with the increase in said wind of motion.

2. In a flying machine, the combination with means acting on the surrounding air whereby the direction of motion of said machine is controlled; means for moving said controlling means; and automatically adjustable means interposed between said moving means and said controlling means whereby their relative amount of motion may be modified.

3. In a flying machine, the combination with means acting on the surrounding air whereby the direction of motion of said machine is controlled; means for moving said controlling means; and means controlled by the wind of motion of the flying machine and interposed between said moving means and said controlling means whereby their relative amount of motion is modified with the changes in the wind of motion.

4. In a flying machine, the combination with a plane having the front and rear sections thereof relatively adjustable; adjustable means connecting said sections whereby they are mutually and simultaneously adjusted; and means controlled by the wind of motion of the flying machine and adapted to adjust said sections to decrease the curvature of the plane with the increase in said wind of motion.

5. In a flying machine, the combination with a plane having the front and rear sections thereof relatively adjustable; means acting on said adjustable sections to turn them downward and to increase the depth of curvature of the plane section; and means controlled by the wind of motion of the flying machine and acting on said adjustable sections in upward direction whereby said downward turning means is opposed and the depth of curvature of the plane is decreased with the increase in the wind of motion.

6. In a flying machine, the combination with a wing having a substantially fixed point in the ribs thereof, the front and rear portions of each rib being vertically adjustable relatively to the fixed portion; means acting on the front and rear portions of the wing to deflect them downward relatively to said fixed portion and to increase the depth of the curvature of the wing section; means engaging the adjustable portions of the ribs and reacting on said fixed point whereby the motions of said adjustable portions are adjusted; and means controlled by the wind of motion of the flying machine and adapted to actuate said engaging means to decrease the depth of the curvature of the wing section with the increase in said wind of motion.

7. In a flying machine, the combination with a wing having a substantially fixed portion in the ribs thereof, the front and rear portions of each rib being vertically adjustable relatively to the fixed portion; means acting on the front and rear portions of the wing to deflect them downward relatively to said fixed portion and to increase the depth of the curvature of the wing section; and means engaging the adjustable portion of the ribs and reacting on the said fixed portion whereby the motions of said ends are adjusted to decrease the depth of curvature of the wing section.

8. In a device for controlling a flying machine, the combination with a controlling means; a wind operated wheel; radial arms mounted on said wheel and radially movable therein; weights carried on said arms; and means connecting said arms to said controlling means whereby the centrifugal force of the revolving weights is transmitted to act on said controlling means.

9. In a flying machine, the combination with a plane having the front and rear sections thereof relatively adjustable; means connecting said sections whereby they are mutually and simultaneously adjusted; and means controlled by the wind of motion of the flying machine and adapted to actuate said adjusting means with changes in the wind of motion of the flying machine.

10. In a flying machine, the combination with means acting on the surrounding air whereby the direction of motion of the machine is controlled; means for moving said controlling means; and means controlled by the wind of motion of the flying machine whereby the relative amount of motion of said moving means and said direction controlling means is modified with changes in the wind of motion.

11. In a flying machine, the combination with a plane having the front and rear sections thereof relatively adjustable; adjustable means connecting said sections whereby they are mutually and simultaneously adjusted; and means controlled by the wind of motion of the flying machine and adapted to adjust the curvature of said plane with changes in the wind of motion.

12. In a flying machine, the combination with means acting on the surrounding air whereby the machine is controlled; an actuating lever; means connecting said lever with said controlling means whereby the motion of the lever is transmitted to the controlling means; and automatically adjustable means engaging said transmitting means whereby the relative motion of the two ends thereof may be modified.

13. In a flying machine, the combination with means acting on the surrounding air whereby the machine is controlled; an actuating lever; means connecting said lever with said controlling means whereby the motion of the lever is transmitted to the controlling means; and adjustable means controlled by the wind of motion of the flying machine and engaging said transmitting means whereby the relative motion of the two ends thereof is modified with changes in the wind of motion.

14. In a flying machine, the combination with means acting on the surrounding air whereby the machine is controlled; an actuating lever mechanism connected at one end to said controlling means and adapted to be operated from the other end; and an automatically adjustable fulcrum forming part of said lever mechanism whereby the relative motions of the two ends thereof may be modified.

15. In a flying machine, the combination with means acting on the surrounding air whereby the machine is controlled; an actuating lever mechanism connected at one end to said controlling means and adapted to be operated from the other end; and an adjustable fulcrum controlled by the wind of motion of the flying machine and forming part of said lever mechanism whereby the relative motions of the two ends thereof are modified with changes in the wind of motion.

16. In a flying machine, a controlling surface; means for shifting said surface; adjustable mechanism interposed between the controlling surface and the shifting means, whereby a given extent of movement of the shifting means will produce a variable extent of motion of the controlling surface; and wind controlled means for automatically shifting said adjustable mechanism.

17. In a flying machine, a controlling surface; manually operable means for shifting said surface; adjustable mechanism interposed in the connecting means between the controlling surface and the manually operable means, whereby a given extent of movement of the manually operable means will produce a variable extent of motion of the controlling surface; and wind controlled means for automatically shifting said adjustable mechanism.

18. In a flying machine, a plurality of controlling surfaces; mechanisms for independently shifting said surfaces; and automatically adjustable means interposed between said shifting mechanisms and the controlling surfaces whereby a given extent of motion of either shifting mechanism will produce a variable extent of motion of the related controlling surface.

19. In a flying machine, a plurality of controlling surfaces; manually operable mechanisms for independently shifting said surfaces; and automatically adjustable mechanism interposed between said manually operable mechanism and the controlling surfaces, whereby a given extent of motion of either manually operable mechanism will produce a variable extent of motion of the related controlling surface.

20. In a flying machine, a plurality of controlling surfaces; means for independently shifting each surface; adjustable mechanism interposed between the controlling surfaces and their shifting means, whereby a given extent of movement of a manually operable means will produce a variable extent of motion of the related controlling surface; and wind controlled means for automatically shifting said adjusting mechanism.

21. In a flying machine, a plurality of controlling surfaces; manually operable means for independently shifting each surface; adjustable mechanism interposed between the controlling surfaces and their manually operable means whereby a given extent of movement of a manually operable means will produce a variable extent of motion of the related controlling surface and wind controlled means for automatically shifting said adjusting mechanism.

22. In a flying machine, the combination with means acting on the surrounding air whereby the machine is controlled; manually operable means connected therewith and adapted to move said controlling means; and wind controlled adjustable means interposed between said moving means and said controlling means whereby the ratio of their relative motion may be modified.

ROBERT M. THOMPSON.

Witnesses:
A. M. RICHARDS,
A. ALLEN.